United States Patent [19]

Matsumoto

[11] Patent Number: 5,897,643
[45] Date of Patent: Apr. 27, 1999

[54] SYSTEM FOR MAINTAINING A RECORD OF DOCUMENTS INCLUDING DOCUMENT COPIES

[75] Inventor: Takashi Matsumoto, Kanagawa, Japan

[73] Assignee: Fuji Xerox Co., Ltd., Tokyo, Japan

[21] Appl. No.: 08/634,832

[22] Filed: Apr. 19, 1996

[30] Foreign Application Priority Data

Apr. 20, 1995 [JP] Japan ................................. 7-117728

[51] Int. Cl.[6] .............................................. G06F 17/00
[52] U.S. Cl. ........................................................ 707/511
[58] Field of Search .................................. 395/133–139; 345/433–439; 707/511

[56] References Cited

U.S. PATENT DOCUMENTS 5,526,407  6/1996  Russell et al. ............................ 379/89

FOREIGN PATENT DOCUMENTS

5-324438  12/1993  Japan.

*Primary Examiner*—Almis R. Jankus
*Attorney, Agent, or Firm*—Finnegan, Henderson, Farabow, Garrett & Dunner, L.L.P.

[57] ABSTRACT

A document copy-relationship management system for managing a copy relationship between documents based on document copy operations performed by a document processing device. The system maintains a data base including an ID table for each document recorded in the system according to the identifier of each document and the location and update date and time of each document, and it also maintains a link information table storing data associating the identifier of an original document and its update date and time and the identifier of a copy document and its update date and time. Also, based on copy operations performed by the document processing device, an ID issue routine is executed to provide a new identifier for the copy document, an ID table update routine writes in the ID table according to the newly issued identifier the location and update date and time of the copy document, and a link information table update routine writes in the link information table data associating the identifier of the copy document and its copy date and time and the identifier of the original document and its most recent update date and time.

16 Claims, 9 Drawing Sheets

| DOCUMENT ID | DATE AND TIME OF CHANGE | LOCATION | DOCUMENT NAME |
|---|---|---|---|
| 1 | 95.2.3 15:15 | MANUFACTURING DEPT. | SPECIFICATIONS |
| 2 | 95.2.3 11:25 | DEVELOPMENT DEPT. | SPECIFICATIONS |
| 3 | 95.1.21 8:05 | SALES DEPT. 1 | SPECIFICATIONS |
| 4 | 95.2.3 12:55 | SALES DEPT. 1 | SPECIFICATIONS |

| ORIGINAL DOCUMENT ID | DATE AND TIME OF CHANGE MADE TO ORIGINAL DOCUMENT | COPY DOCUMENT ID | COPY DATE AND TIME |
|---|---|---|---|
| 1 | 95.1.9 17:43 | 2 | 95.2.3 11:25 |
| 2 | 95.1.20 9:25 | 3 | 95.1.21 8:05 |
| 2 | 95.2.3 11:25 | 4 | 95.2.3 12:55 |

| DOCUMENT ID | DATE AND TIME OF CHANGE | LOCATION | DOCUMENT NAME | ERASE |
|---|---|---|---|---|
| 1 | 95.2.3 15:15 | MANUFACTURING DEPT. | SPECIFICATIONS | FALSE |
| 2 | 95.2.3 11:25 | DEVELOPMENT DEPT. | SPECIFICATIONS | FALSE |
| 3 | 95.1.21 8:05 | SALES DEPT. 1 | SPECIFICATIONS | TRUE |
| 4 | 95.2.3 12:55 | SALES DEPT. 1 | SPECIFICATIONS | FALSE |

SYSTEM FOR MAINTAINING A RECORD OF DOCUMENTS INCLUDING DOCUMENT COPIES

BACKGROUND OF THE INVENTION

1. Field of the Invention

The present invention relates to a system for managing a record of documents and of the copy relationship between documents, and specifically to a system for recording the location and the identity of documents that have a copy relationship.

2. Description of the Related Art

As a system for managing the copy relationship between documents, a management apparatus is known that is described in the Japanese Patent Unexamined Publication No. Hei. 5-324438.

In this management apparatus, a link information table is provided for storing the copy relationship between documents by the use of mutual identifiers; when a copy operation has been performed, the copy relationship between documents is recorded in the link information table, and the document names of the respective documents are stored in an ID table corresponding to the document identifiers.

Therefore, the copy relationship between documents is managed in the link information table, and no matter how many times documents have been copied and recopied, by retrieving the link information table, one can easily obtain information about the copy relationship. Also, by retrieving the ID table based on the identifier of a document, the corresponding document name can also be easily obtained.

Here, when considering the actual use environment of documents, from time to time the contents of documents are updated, or their management location is changed. If such updates of document contents and changes of location could be managed, document management would be made more convenient.

However, with the conventional management apparatus, the link information table is simply for storing the identifiers of documents that have a copy relationship, and the ID table is also simply for storing the document names; one cannot perform such management as determining whether the contents of the original document and the copy document are identical to each other, and where each of the documents that have a copy relationship is saved.

Furthermore, in an environment where documents are actually used, a document processing apparatus that comprises a personal computer and so forth, does not only perform the copying of one electronic-data document to another electronic-data document; it performs various types of copy processing, such as copying an electronic-data document to a document printed on a paper medium, copying a document printed on a paper medium to a document printed on another paper medium, and copying a document printed on a paper medium to an electronic-data document.

However, with the conventional management apparatus, the copy relationship between documents with respect to these types of copy processing cannot be managed, and management that is especially suited to the actual use environment of documents is highly desirable.

SUMMARY OF THE INVENTION

The present invention was made in view of the above-described existing circumstances, and it is an object of the invention to provide a document copy-relationship management system capable of managing not only the copy relationship between documents, but also document copy date and time information and information concerning document location.

In order to accomplish the above object, the invention provides a document copy-relationship management system for managing a copy relationship of documents based on document copy operations performed by a document processing device, the system comprising: an ID table for managing each document recorded in the system by contrasting an identifier of the document with location and update date and time of the document; a link information table for managing by contrasting an identifier and update date and time of an original document with an identifier and copy date and time of its copy document; an ID issue means for issuing a new identifier to a copy document that was copied based on copy operations of the document processing device; an ID table update means for writing into the ID table according to the newly issued identifier the location and update date and time of the copy document; and a link identification table update means for writing into the link information table a contrast between an identifier of a copy document that was copied based on copy operations of the document processing device and its copy date and time, and an identifier of the original document and its most recent update date and time.

DETAILED DESCRIPTION OF THE PREFERRED EMBODIMENTS

Embodiment 1

Hereinafter, a preferred embodiment of the document copy-relationship management system of the present invention will be described with reference to the accompanying drawings.

Figure 1:
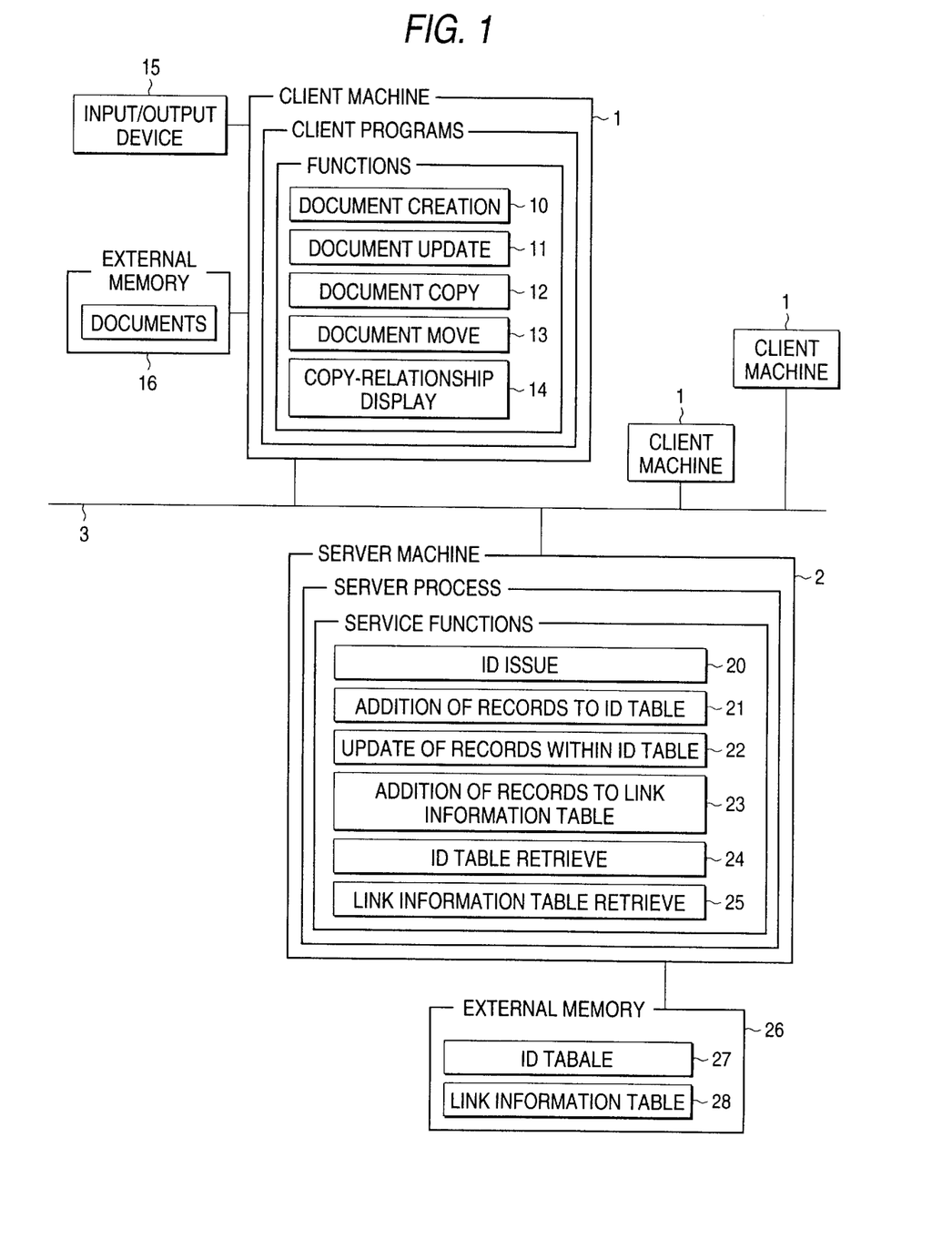
FIG. 1 is a block diagram showing the configuration of a document copy-relationship management system according to a preferred embodiment of the present invention.

As shown in FIG. 1, the document copy-relationship management system of the embodiment is comprised of a plurality of client machines 1 that are the document processing apparatuses, a server machine 2 that is the apparatus for managing the copy relationship of documents, and a network 3 that connects these machines.

Furthermore, the document copy-relationship management system of the present invention is not limited to the above-described configuration in which the document processing apparatus and the document copy-relationship processing apparatus are separated from each other; it may also comprise a single apparatus that unites both of these processing sections.

Each of the client machines 1 in the embodiment is configured by a personal computer for executing the client programs that perform various types of document processing, and includes a document creation section 10 for performing processing through the execution of the above-described programs, a document update section 11, a document copy section 12, a document move section 13, and a copy relationship display section 14. Each client machine 1 also includes an input/output device 15 having an output functions section comprised of a display for displaying documents and a printer for print outputting, and an input functions section comprised of a keyboard and a mouse, and an external memory device for storing the electronic data of documents with a hard-disk apparatus or the like.

Moreover, each client machine 1 is pre-assigned a machine name to enable the ready identification of each machine in the network; these machine names are used to identify the location of documents that are stored in the external memory device 16 of each client machine 1.

Also, together with documents, corresponding document names and document identifiers (document IDs) that are provided in the system are saved in the external memory device 16.

The document creation section 10, based on instructions from the input/output device 15, performs the creation of new document files, and stores in the external memory device 16 of its own client machine 1 the created documents. The document update section 11, based on instructions from the input/output device 15, performs update processing such as editing of the contents of documents that are stored in the external memory device 16 of its own client machine 1, and re-stores in the external memory device 16 the updated documents. The document copy section 12, based on instructions from the input/output device 15, creates duplicates of the documents that are stored in the external memory device 16 of its own client machine 1, and re-stores in the external memory device 16 the created copy documents.

The document move section 13, based on instructions from the input/output device 15, performs the transfer processing of documents stored in the external memory device 16 of its own client machine 1 to another client machine 1 via the network 3; it also performs in its own external memory device 16 storage processing of documents that have been transmitted via the network 3 from another client machine 1. The copy relationship display section 14, based on instructions from the input/output device 15, receives document copy-relationship information from the ID table and the link-information table which will be described later, and displays this information on the display screen of the input/output device 15.

The server machine 2 of the embodiment is configured by a personal computer for executing the server processes for performing the processing of various types of copy relationship, and includes an ID issue section 20 for performing processing through the execution of the above-described processes, an ID table records addition section 21, an ID table records-update section 22, a link information table records addition section 23, an ID table retrieve section 24, and a link information table retrieve section 25. Also, the server machine 2 includes an external memory device 26 having a hard-disk device or the like; an ID table 27 and a link information table 28 are stored in this external memory device 26.

Figure 2:
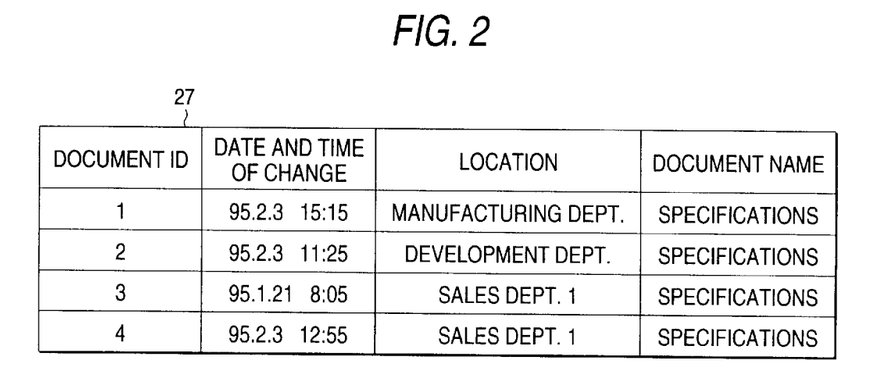
FIG. 2 is an explanatory diagram showing an example of the storage contents of an ID table.

The ID table 27 possesses contents such as those shown in FIG. 2; it identifies for each document information stored in the external memory device 16 of any of the client machines 1. In other words, the ID table 27 stores the last (i.e., the most recent) date and time of the update of the contents of a document, the location of the document, and the document name corresponding to the ID (identifier) assigned to each document.

For example, the document with the document ID "1" was most recently updated at 15:50 on Feb. 3, 1995, it is located in the manufacturing department, and the document name is "specifications".

Figure 3:
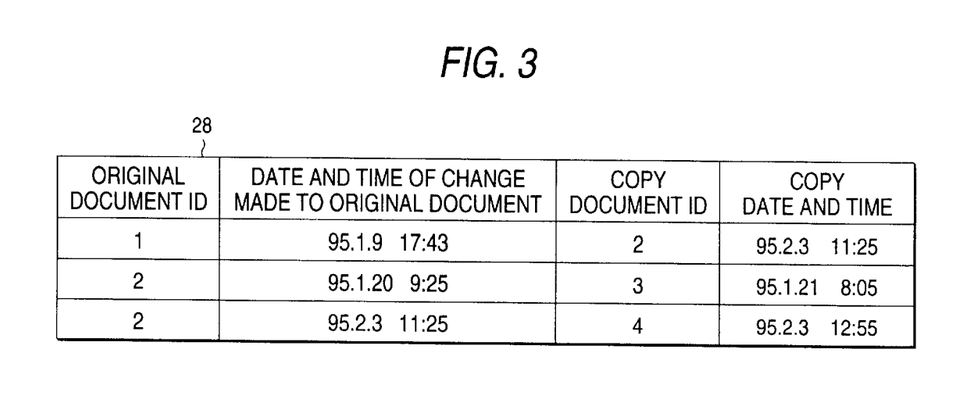
FIG. 3 is an explanatory diagram showing an example of the storage contents of a link information table.

The link information table 28 possesses contents such as those shown in FIG. 3; it stores information about the copy relationship between documents that are stored in the external memory device 16 of any of the client machines 1 by showing together those documents that have a copy relationship. In other words, the link information table 28 shows together documents that have a copy relationship by using each of their ID numbers; it attaches as a "copied original document update date and time" the most recent update date and time of an original document at the time that copy processing was performed using that original document. It also attaches to copy destination documents (i.e., documents that are copies of an original) as a "copy destination document update date and time" the date and time on which copy processing was performed.

For example, the document with document ID "1" was used as the original to create a copy that is document ID "2"; this copy processing was performed at 11:25 on Feb. 3, 1995. At the time of this copy processing, the original document had most recently undergone update processing at 17:43 on Jan. 9, 1995.

Also, the above-described ID issue section 20 issues, based on an issue demand from a client machine 1, non-duplicated identifiers (ID) for documents, and sends these to the client machine 1 that has made the request. The ID table records addition section 21 forms, at the time when a client machine 1 is store processing a new document in the output memory device 16, a new column in the ID table 27 with the information about that document that has been given a new identifier, and adds and stores this information therein. The ID table records-update section 22 updates, at the time when a client machine 1 is update processing a document that has been already stored in the external memory device 16, the information about this document stored in the ID table 27.

The link information table records addition section 23 creates, at the time when a client machine 1 has performed copy processing and is store processing the new document in the external memory device 16, new columns in the link information table 28 that show together in contrast information concerning the original document and information concerning the document that is the copy, and adds and stores this information therein. The ID table retrieve section 24 retrieves, based on a retrieve request from a client machine 1, the ID table 27, reads out from the ID table 27 information that corresponds to the document ID designated in the retrieve request, and sends this information to the client machine 1 that has made the request. The link information table retrieve section 25 retrieves, based on a retrieve request from a client machine 1, the link information table 28, reads out from the link information table 28 information that corresponds to the document ID designated in the retrieve request, and sends this information to the client machine 1 that has made the request.

Processing using the document copy-relationship management system configured as described above will be explained by referring to a flowchart.

Figure 4:
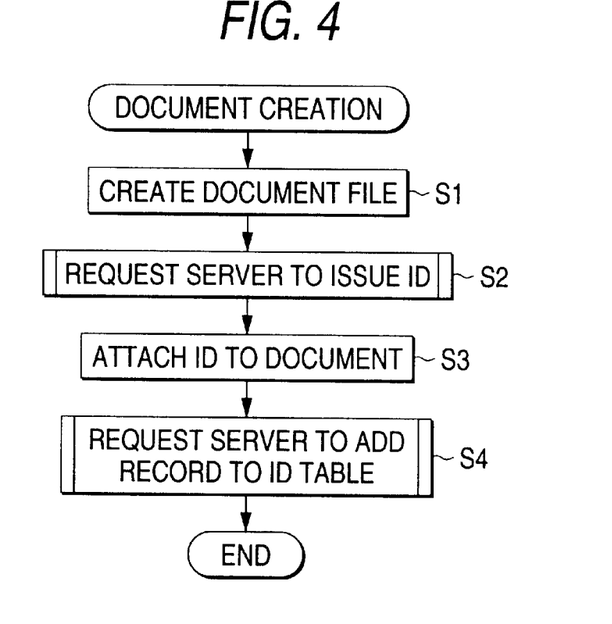
FIG. 4 is a flowchart showing the document creation processing procedures in the embodiment.

As shown in FIG. 4, in the case where a new document is to be created with a client machine 1, when a user designates a document name with the input/output device 15 and performs the operations for creating a new document, the document creation section 10 creates the document with the designated document name (step S1). Then, when storing this document in the external memory device 16, the document creation section 10 requests via the network 3 to the server machine 2 the issue of a new document ID (step S2). The new document ID issued by the ID issue section 20 in response to this request is then received via the network 3.

Then, the document creation section 10 attaches the received new document ID to the created document and stores it in the external memory device 16 (step S3); together with this, it attaches together with this document ID the date and time of document creation, the location of the created document, and the document name, and requests to the ID table records addition section 21 the addition of this information (step S4). As a result, the ID table records addition section 21 creates a new column in the ID table 27, and adds and stores in this column information about this created document according to its document ID.

Figure 5:
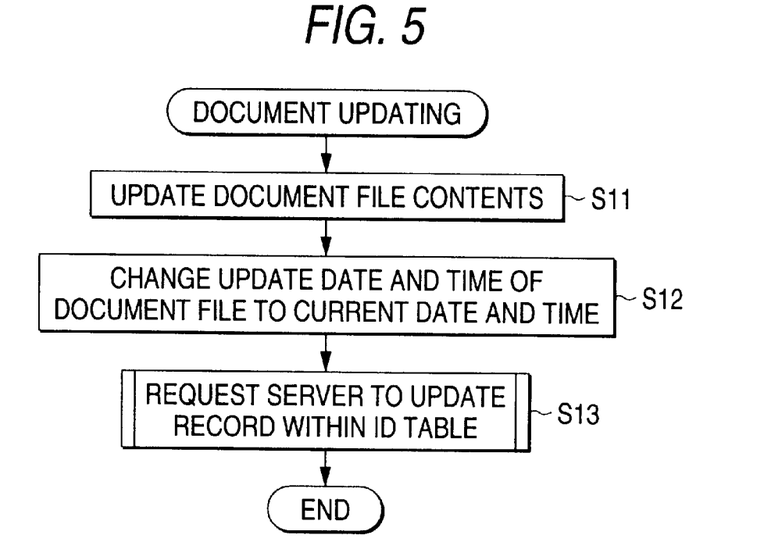
FIG. 5 is a flowchart showing the document update processing procedures in the embodiment.

As shown in FIG. 5, in the case where the contents of a document already stored in the external memory device 16 is to be updated with a client machine 1, when a user designates the document name with the input/output device 15 and performs the operations for updating this document, the document update section 11 updates the document with the designated document name (step S11). Then, together with this update processing, the document update section 11 sets the current date and time as the update date and time for this document (step S12), and requests via the network 3 to the ID table records-update section 22 update processing for the attached document name (step S13).

As a result, the ID table records-update section 22 rewrites the current date and time as the update date and time in the column of the ID table 27 that contains the requested document name.

Therefore, every time a document undergoes update processing, the update time and date information in the ID table 27 is rewritten, and the most recent update time and date information is recorded.

Figure 6:
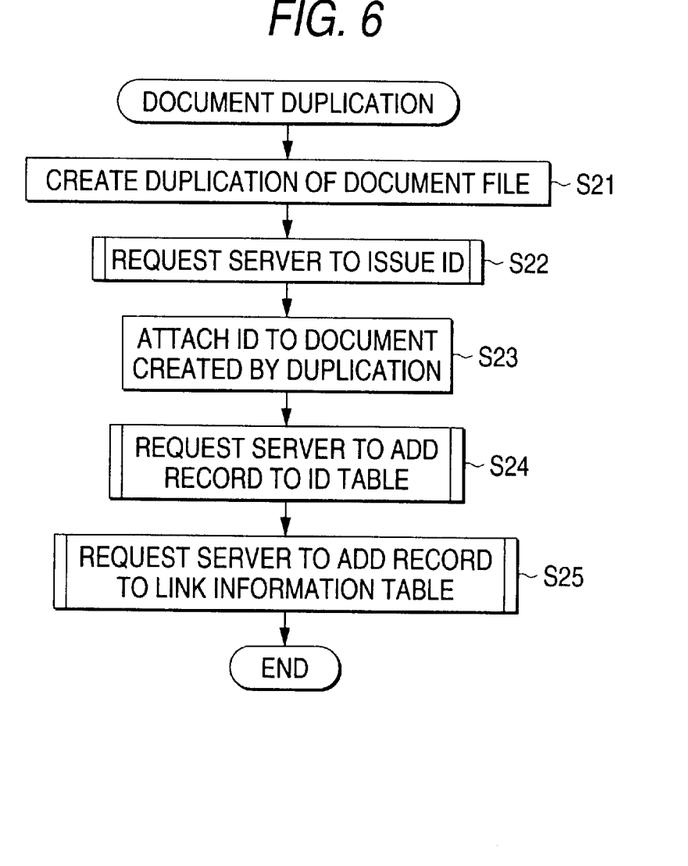
FIG. 6 is a flowchart showing the document copy processing procedures in the embodiment.

As shown in FIG. 6, in the case where the copying of a document is to be performed with a client machine 1, when a user designates with the input/output device 15 the document name of the original document to be copied and performs the operations for creating a duplicate of this document, the document copying section 12 creates a copy document from the document with this designated document name (step S21). Then, when storing this document in the external memory device 16, the document copy section 12 requests to the server machine 2 via the network 3 the issuing of a new document ID (step S22). The new document ID issued by the ID issue section 20 in response to this request is received via the network 3.

Then, the document copy section 12 attaches the received new document ID to the document obtained by copying and stores this in the external memory device 16 (step S23); it then attaches together with this document ID the date and time of copying, the location of the document obtained by copying and the document name and requests to the ID table records addition section 21 the addition of this information (step S24). As a result, the ID table records addition section 21 creates a new column in the ID table 27, and adds and stores in this column information about this created document according to its document ID.

Also, the document copy section 12 attaches to the above-described new document ID and the document ID of the original document the date and time of copying, and requests to the link information table records addition section 23 the addition of this information (step S25). As a result, the link information table records addition section 23 obtains the most recent update date and time information about the original document from the ID table 27, and, together with this, creates a new column in the link information table 28, and adds and stores in this column the document ID of the original document and its update date and time, as well as the document ID of the copy document and its update date and time.

Figure 7:
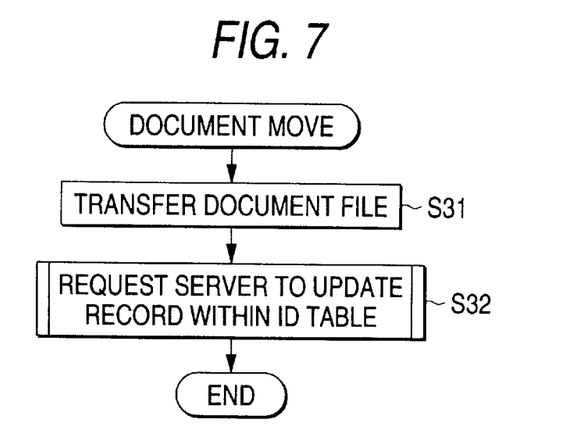
FIG. 7 is a flowchart showing the document move processing procedures in the embodiment.

Also as shown in FIG. 7, in the case where a document that has been already stored in the external memory device 16 of a client machine 1 is to be moved via the network 3 to another client machine 1, when a user designates a document name with the input/output device 15 and performs the operations for moving this document, the document move section 13 reads out from the external memory device 16 the document that has the designated document name and transfers it to the designated client machine 1 (step S31). Then, together with this move processing, the document move section 13 requests the ID table records-update section 22 to perform update processing by adding the name of the machine to which the document was transferred (the location) to the name of the document that was moved (step S32).

As a result, the ID table records-update section 22 rewrites a new location to the location section in the column of the ID table 27 that corresponds to the requested document name.

Therefore, every time move processing of a document is performed, location information in the ID table 27 is rewritten, and the latest location is recorded.

Figure 8:
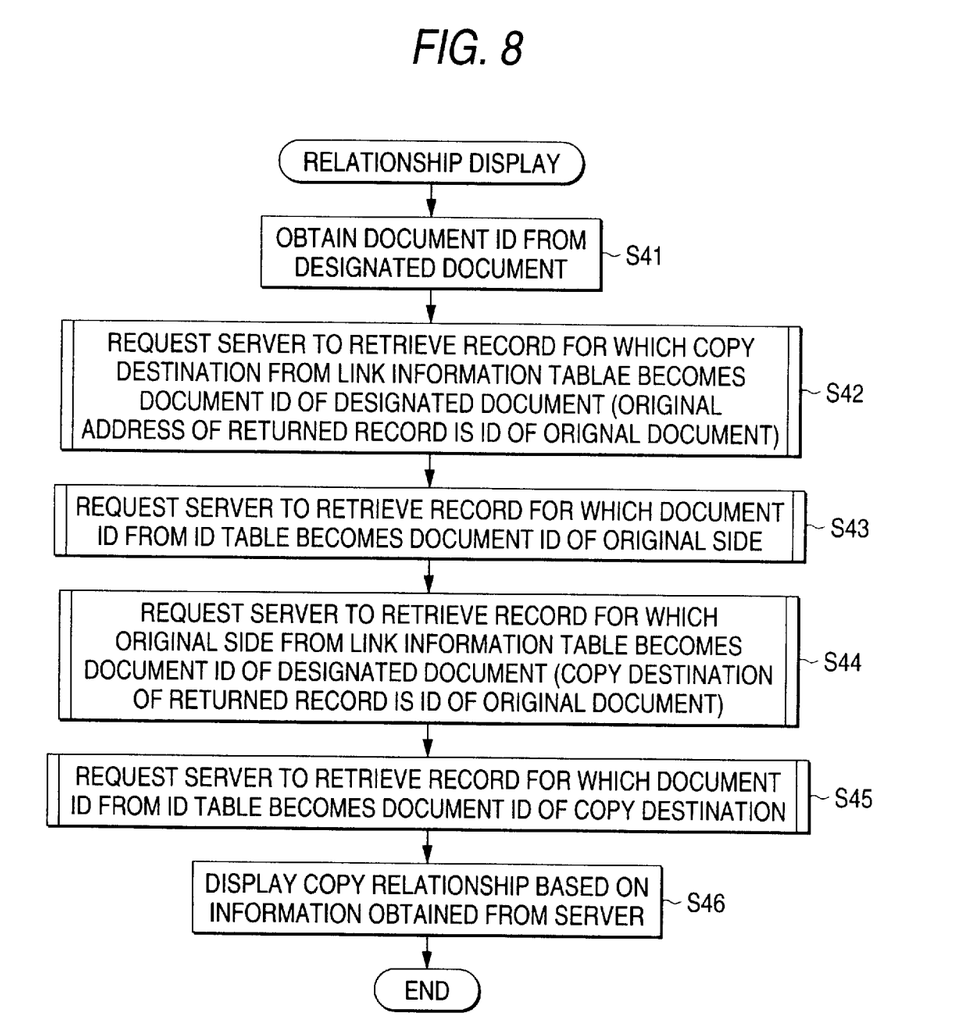
FIG. 8 is a flowchart showing the copy-relationship display processing procedures in the embodiment.

Also, as shown in FIG. 8, in the case where the copy relationship of documents is to be displayed using a client machine 1, when a user designates a document name with the input/output device 15 and performs the operations for displaying the copy relationship, the copy relationship display section 14 obtains, based on the document name from the external memory device 16, a document ID (step S41), and requests to the link information table retrieve section 25 a retrieve for the record that uses this document ID as its copy document ID (step S42). When the copy relationship display section 14 receives via the network 3 the record retrieved by the link information table retrieve section 25 in response to the request, the copy relationship display section 14 requests, based on the record received, to the ID table retrieve section 24 a record retrieve for the original document ID (step S43).

Also, the copy relationship display section 14 requests to the link information table retrieve section 25 a retrieve for the record that uses the designated document ID as its original document ID (step S44). When the copy relationship display section 14 receives via the network 3 the record retrieved by the link information table retrieve section 25 in response to the request, the copy relationship display section 14 requests, based on the record received, to the ID table retrieve section 24 a retrieve for the copy document ID (step S45).

From the results of the above-described retrieves in the ID table 27 and the link information table 28, the relationship information display section 14 obtains information of the original document and the copy document concerning the designated document as well as information concerning the location and update status of these documents, and displays the information on the display screen of the input/output device 15 (step S46).

Figure 9:
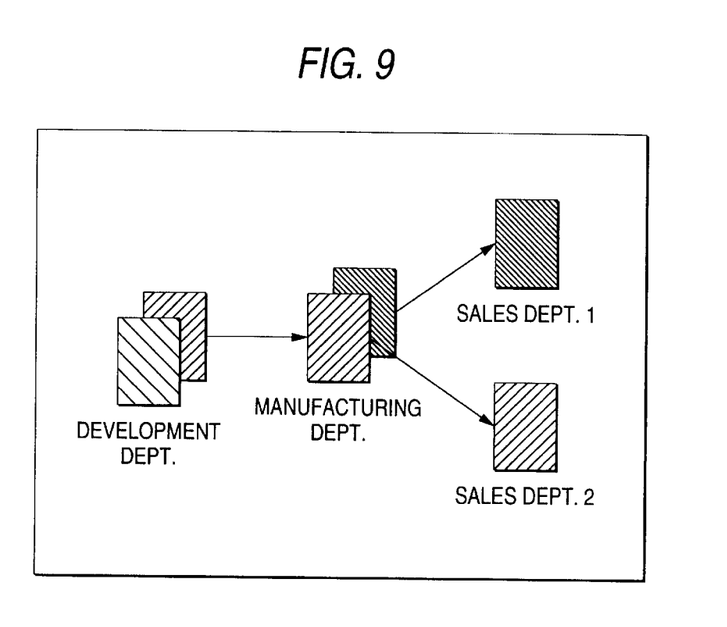
FIG. 9 is an explanatory diagram showing an example of a copy-relationship display.

The information displayed on the display screen may be, for example, as shown in FIG. 9. There, the following situation is displayed using typical graphics and arrows: the target document of the development department was copied and the document copy is located in the manufacturing department; furthermore, this document was copied as two different documents, one of which is located in the sales department 1 and the other in the sales department 2.

Since not only the copy relationship, but also information concerning the location and update status of a document is displayed, a user can easily grasp the relationship between documents as well as the status of each separate document.

Figure 10:
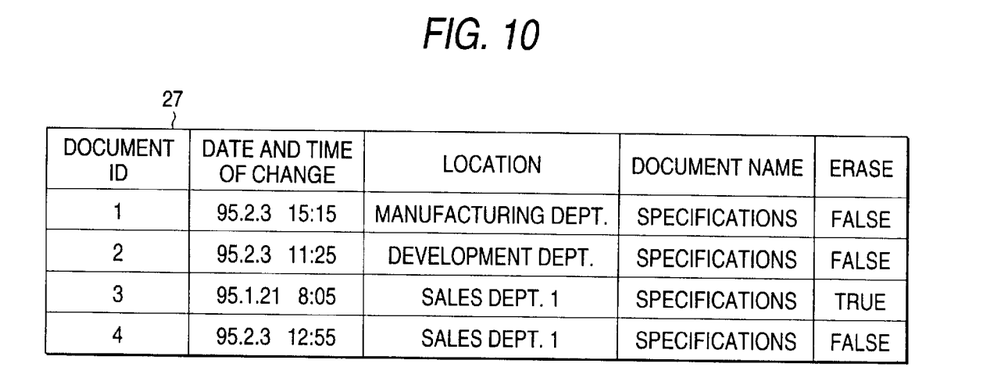
FIG. 10 is an explanatory diagram showing another example of the storage contents of the ID table.

Moreover, when necessary, the above-described ID table 27 and link information table 28 may also be made to store other kinds of information; for example, as shown in FIG. 10, the information concerning erasure of a document may be added in the ID table 27, and the fact that a document has been erased and no longer exists may also be managed by using a statement "TRUE" when a document has been erased and a statement "FALSE" when a document has not been erased.

As described above, with the document copy-relationship management system of the invention, in the case where a user wants to know where copies of the document he or she possesses are located, the user performs a record retrieval operation from the link information table 28 for the record with the original document ID that is equivalent to the document ID that the user possesses, and by using the document IDs recorded for its copied documents, the user can retrieve information indicating their locations from the ID table 27.

Also, in the case where a user wants to know where the original of the document he or she possesses is located, the user performs a record retrieved via the link information table 28 for the record with the copy document ID that is equivalent to the document ID that the user possesses, and by using the document ID of its original document, the user can retrieve information indicating the location of the original document the ID table 27.

Then, since the update time and date of the copy document stored in the link information table 28 is not changed after the copy processing has been performed, while the update time and date of the copy document in the ID table 27 is updated from time to time, by comparing both update times and dates, if the update time and date in the link information table 28 is older than the update time and date in the ID table 27, then the user knows that the contents of the copy document have been updated following the copy. Conversely, in the case where the update time and date of a document at hand is more recent than the update time and date of the original document in the link information table 28, then the user knows that the contents of the document he or she possesses have been updated following the time it was copied.

Embodiment 2

Figure 11:
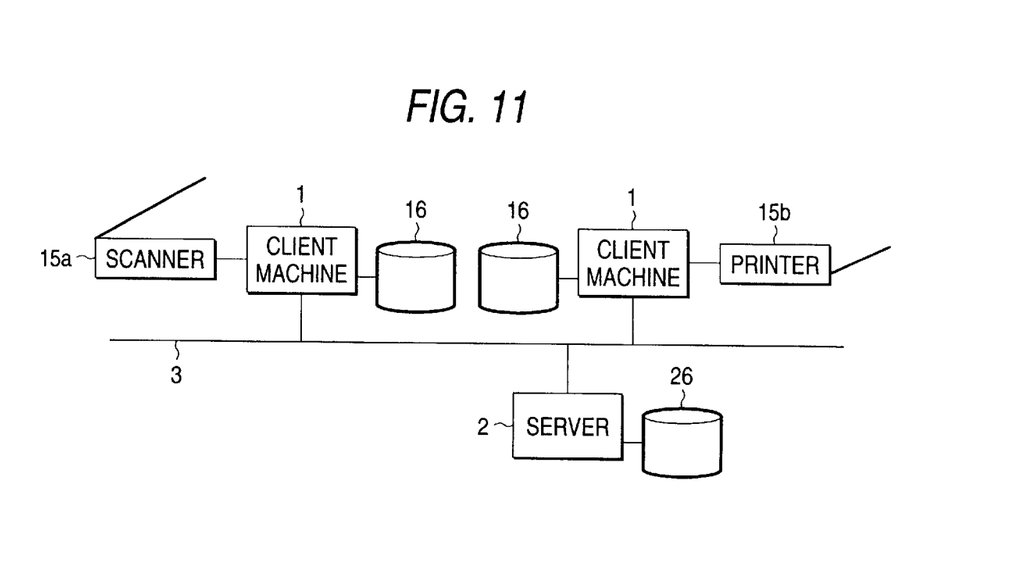
FIG. 11 is a block diagram showing the configuration of a document copy-relationship management system according to another embodiment of the present invention.

FIG. 11 shows another preferred embodiment of the document copy-relationship management system of the present invention. Portions that are equivalent to those in the above-described embodiment are designated with the same reference numerals, and to avoid overlapping, will not be described again below.

Embodiment 2 has as its object the transfer to an electronic data document of a paper-medium document and the print output of an electronic data document to a paper medium, two forms of document copying; it also performs the management of such paper-medium documents and electronic data documents. Therefore, the document copy-relationship management system of embodiment 2 comprised of a client machine 1 that is provided with a scanner 15a as its input/output device for the optical reading of a paper-medium document to transform it into electronic data, and a client machine 1 that is comprised of a printer 15b as its input/output device for the print output of an electronic data document onto a paper-medium. These client machines are connected to each other via the network 3.

Figure 12:
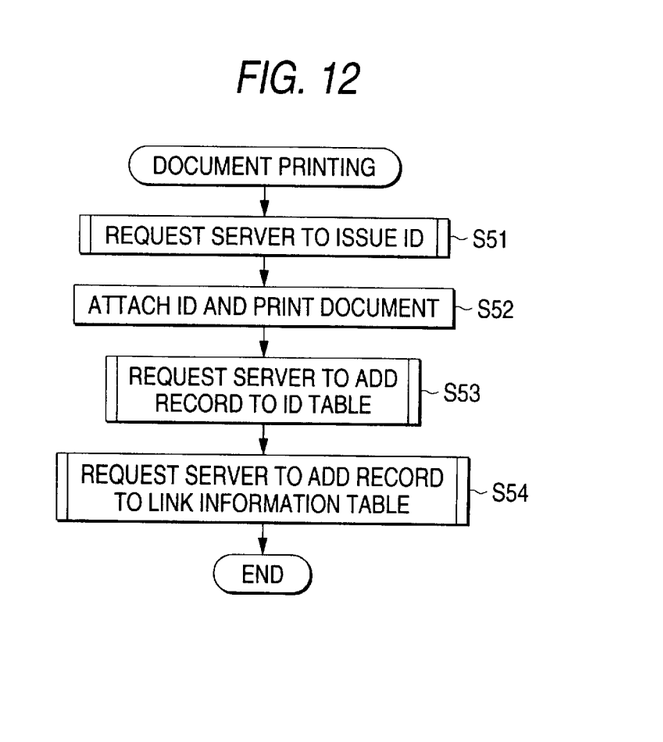
FIG. 12 is a flowchart showing the document printing processing procedures in the embodiment.

In the case where print processing is to be performed with the document copy-relationship management system of this embodiment, as shown in FIG. 12, when a user performs operations for attaching a document ID to a document and for the print output of this document from the printer 15b, the client machine 1 requests via the network 3 the server machine 2 to issue a new document ID (step S51); it then receives via the network 3 the new document ID issued from the server machine 2 in response to the request.

Then, the client machine 1 reads out from its external memory device 16 the designated document, records the new document ID received at the printer 15b, and causes the document to be print outputted to a paper medium (step S52).

Then, the client machine 1 requests the ID table 27 of the server machine 2 to add to the ID Table 27 (similar to that shown in FIG. 2), a new document ID, together with the date and time of print output and the location and document name of the printed document (step S53). As a result, the server machine 2 creates a new column in the ID table 27, and adds and stores in this column information about the print outputted paper medium document according to the document ID. The client machine 1 also attaches the time and date of print processing to the original document ID and to the above-described new document ID, and requests the server machine 2 to modify the appropriate link information table 28 (similar to that of FIG. 3) to add this information (step S54). As a result, the server machine 2 creates a new column in the link information table 28, and adds and stores in this column the document ID of the sending-side as well as its update date and time and the document ID of the print outputted document and its printing date and time.

Therefore, document IDs are readily given to documents that are print outputted onto a paper medium, and the related copy-relationship information, location information, and update date and time information is managed.

Moreover, this type of paper-medium document with a document ID attached thereto may be read with the scanner 15a and copied as an electronic-data document, and even in these cases, a new document ID is given to the electronic-data document, and the related copy-relationship information, location information, and update date and time information are stored and managed in the link information table 28 and the ID table 27.

Figure 13:
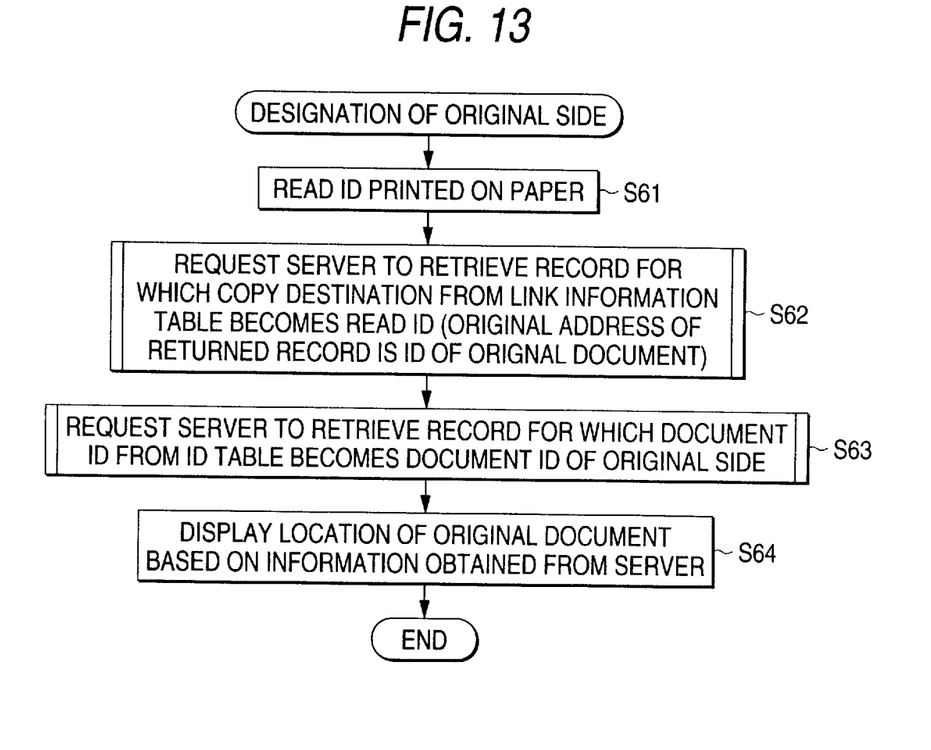
FIG. 13 is a flowchart showing the original side designation processing procedures in the embodiment.

Also, with the document copy-relationship management system of this second embodiment, in order to designate the print location of the paper-medium document, as shown in FIG. 13, when the user performs operations for reading in with the scanner 15a the paper-medium document that has an attached document ID, the client machine 1 reads out that document ID (step S61). Then, the client machine 1 sends a request via the network 3 to the server machine 2 for a retrieve in the link information table 28 for the record that takes the read document ID as the original document ID (step S62). The client machine 1 then receives via the network 3 the record retrieved by the server machine 2 in response to this request (step S62).

Then, based on the original document ID of the record the client machine 1 has received, the client machine 1 sends a request via the network 3 to the server machine 2 for a retrieve in the ID table 27 for the record concerning the just-mentioned original document ID (step S63). The client machine 1 then receives via the network 3 the record retrieved out by the server machine 2 in response to this request. Then, as a result of the above-described data retrieval operations in the ID table 27 and the link information table 28, the client machine 1 obtains information about the original document and the copy document related to the paper-medium document it has read with the scanner 15a, as well as the locations and update status of these documents, and displays this information on the display screen of the input/output device (step S64).

Embodiment 3

Figure 14:
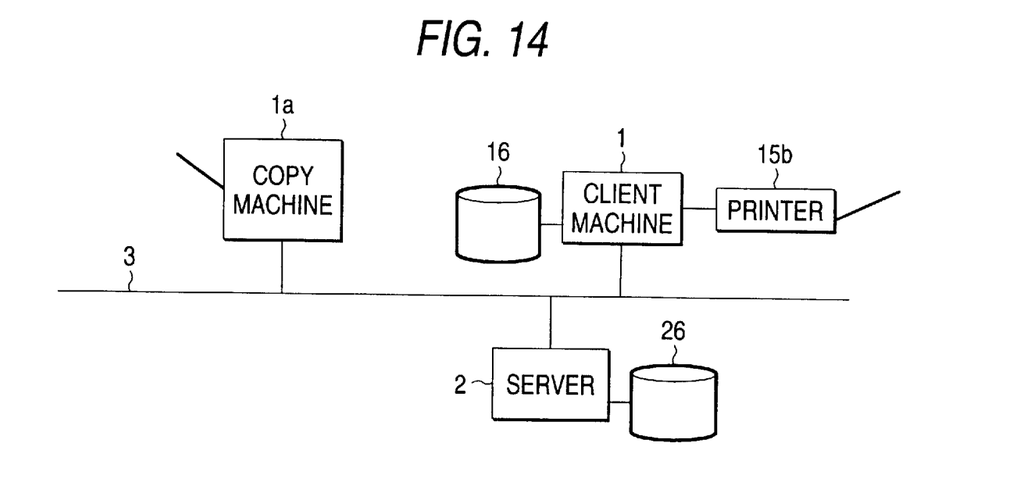
FIG. 14 is a block diagram showing the configuration of a document copy-relationship management system according to still another embodiment of the present invention.

FIG. 14 shows still another embodiment of the document copy-relationship management system of the present invention. Portions of the system that are equivalent to those in the above-described embodiments are designated with the same reference numerals, and to avoid overlapping, will not be described again below.

Embodiment 3 has as its object paper-medium documents that are copied onto another paper medium, an aspect of document copying; it also performs the management of such paper-medium documents. Therefore, the document copy-relationship management system of the this third embodiment is comprised of a copy machine 1a that serves as the client machine and that is connected to the network 3.

Figure 15:
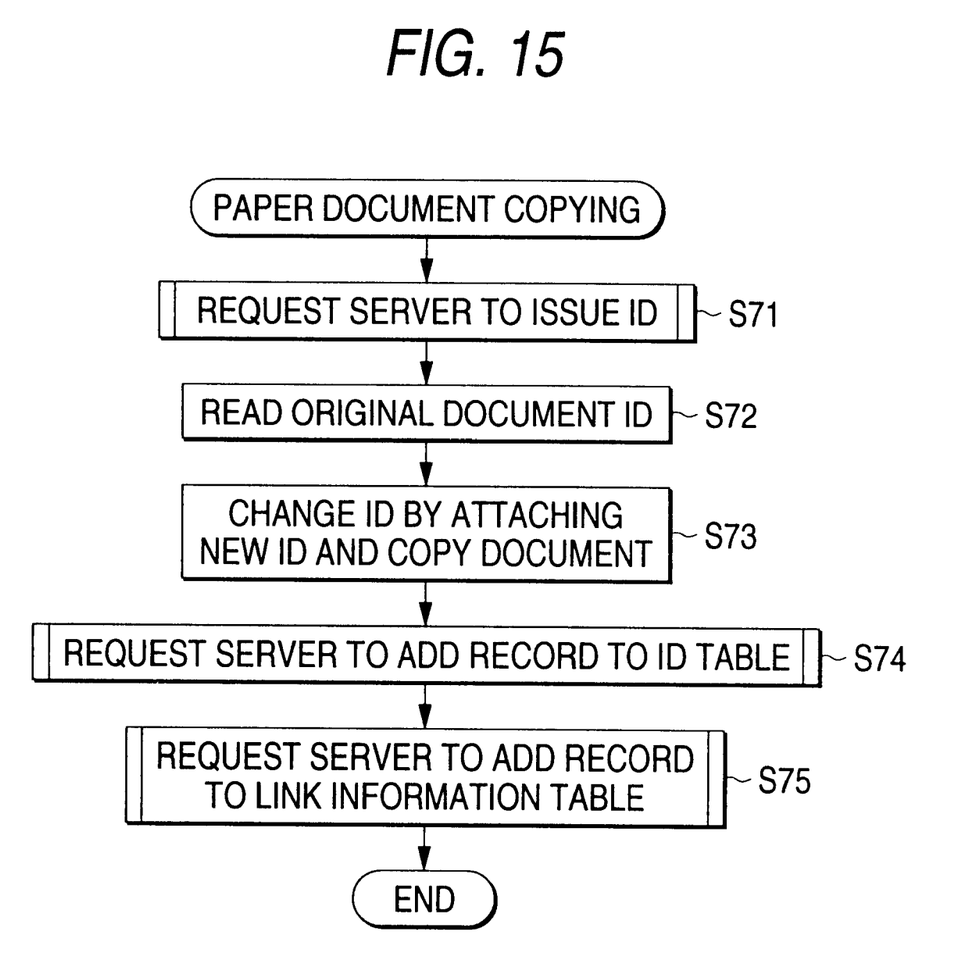
FIG. 15 is a flowchart showing the document copy processing procedures in the embodiment.

In the case where a paper-medium document is to be copied onto another paper medium with the document copy-relationship management system of this embodiment, as shown in FIG. 15, when a user performs operations for creating with the copy machine 1a a duplicate of a paper-medium document that has a document ID attached, the copy machine 1a requests via the network 3 the server machine 2 to issue a new document ID (step S71), and it then receives via the network 3 the new document ID issued from the server machine 2 in response to the request.

Then, the copy machine 1a reads out the document ID from the original paper-medium document (step S72), attaches the above-described new document ID in place of the read document ID, and copies the document onto a paper medium (step S73). Then, the copy machine 1a requests the server machine 2 to add to the ID table 27, together with the new document ID, the date and time of copying and the location and document name of the document obtained by copying (step S74). As a result, the server machine 2 creates a new column in the ID-table 27, and adds and stores in this column, according to the document ID, information about the paper-medium document obtained by copying.

The copy machine 1a also attaches the date and time of copying to the above-described new document ID and to the document ID of the original document, and requests the link information table 28 of the server machine 2 to add this information (step S75). As a result, the server machine 2 creates a new column in the link information table 28, and adds and stores in this column the following information: the original document ID and its update date and time, and the copy document ID and its update date and time.

Therefore, document IDs are readily given to paper-medium documents that are printed onto other paper media, and the related copy-relationship information, location information, and update date and time information is managed.

As explained in detail above, with the document copy-relationship management system of the invention, since documents are managed with a link information table that stores copy-relationship information and an ID table that stores information about each separate document, not only the simple copy-relationship between documents, but also the location and copy date and time of documents can be managed, thereby improving the convenience suited for the actual use environment of documents.

What is claimed is:

1. A document copy-relationship management system for maintaining a record of copy relationships among documents based on document copy operations performed by a document processing device, said system comprising:

an ID table for storing data for each document recorded in the system by associating an identifier of the document with location and update date and time of the document;

a link information table for storing data associating an identifier and update date and time of an original document with an identifier and copy date and time of copying of said original document;

ID issue means for issuing a new identifier to a copy document that was copied based on copy operations of the document processing device;

ID table update means for writing into said ID table according to the newly issued identifier the location and update date and time of said copy document; and link information table update means for writing into said link information table data associating an identifier of a copy document with its copy date and time, and data associating said copy document with an identifier of the original document from which the copy document was made and its most recent update date and time.

2. The document copy-relationship management system as claimed in claim 1, wherein said ID table update means updates the contents of said ID table based on update processing or location change processing of a document processed by the document processing device.

3. The document copy-relationship management system as claimed in claim 1, wherein the document processing device is a device for print outputting a paper-medium document, and wherein said ID issue means issues an identifier for the paper-medium document that is to be print outputted, said document processing device attaches the issued identifier to the document for print outputting it, said ID table update means writes in said ID table according to the newly issued identifier the location and update date and time of the document that has been print outputted, and said link information table update means writes into said link information table data associating the identifier of the document that has been print outputted and the identifier of the original document.

4. The document copy-relationship management system as claimed in claim 1, wherein the document processing device is an image reader for reading out a paper-medium document that has an attached identifier, and for copying the paper-medium document into an electronic-data document, and wherein said ID issue means issues a new identifier for said electronic-data document, said ID table update means writes in said ID table data associating the newly issued identifier with the location and update date and time of said electronic-data document, and said link information table update means writes into said link information table data associating the identifier of the said electronic-data document and the identifier of the original paper-medium document.

5. The document copy-relationship management system as claimed in claim 1, further comprising:

document specifying means for specifying a document;

first retrieving means for retrieving an original document identifier from records in which an identifier of the specified document is set as a copy document identifier in said link information table;

second retrieving means for retrieving from said ID table, document information on the identifier of the specified document and the original document identifier retrieved by said first retrieving means; and display means for displaying information on the specified document and the document information retrieved by said second retrieving means.

6. The document copy-relationship management system as claimed in claim 5, further comprising a recording device, wherein a document of electronic data read with addition of the new document identifier as issued is printed on a sheet of paper by said recording device.

7. The document copy-relationship management system as claimed in claim 1, further comprising:

document specifying means for specifying a document;

first retrieving means for retrieving a copy document identifier from records in which an identifier of the specified document is set as an original document identifier in said link information table;

second retrieving means for retrieving from said ID table, document information on the identifier of the specified document and the copy document identifier retrieved by said first retrieving means; and display means for displaying information on the specified document and the document information retrieved by said second retrieving means.

8. The document copy-relationship management system as claimed in claim 1, further comprising:

document specifying means for specifying a document;

first retrieving means for retrieving an original document identifier from records in which an identifier of the specified document is set as a copy document identifier in said link information table;

second retrieving means for retrieving a copy document identifier from records in which the identifier of the specified document is set as an original document identifier in said link information table;

third retrieving means for retrieving from said ID table, document information on the identifier of the specified document, the original document identifier retrieved by said first retrieving means and the copy document identifier retrieved by said second retrieving means; and display means for displaying information on the specified document and the document information retrieved by said third retrieving means.

9. The document copy-relationship management system as claimed in claim 8, wherein each record of said ID table has a document name, and wherein said document copy-relationship management system further comprises input means for inputting the document name, and fourth retrieving means for retrieving the identifier of the specified document from said ID table based on the inputted document name.

10. The document copy-relationship management system as claimed in claim 8, wherein said display means displays link relationship between the specified document and the document retrieved by said third retrieving means.

11. The document copy-relationship management system as claimed in claim 8, wherein said display means displays locations and/or update statuses of the specified document and the document retrieved by said third retrieving means.

12. The document copy-relationship management system as claimed in claim 11, wherein said ID table has information on deletion of a document and said display means displays the information on deletion of the document.

13. The document copy-relationship management system as claimed in claim 1, wherein a server machine having said ID table and said link information table is connected to a plurality of client machines through a network.

14. The document copy-relationship management system as claimed in claim 13, wherein said ID issue means acquires a new document identifier from said server machine in accordance with a copy operation of a document in said client machines, and said ID table update means and said link information table update means update contents of the tables of said series machine.

15. The document copy-relationship management system as claimed in claim 13, wherein for an editing operation of the document, said ID table update means and said link information table update means update the location of the document in the tables of said server machine in accordance with movement of the document.

16. The document copy-relationship management system as claimed in claim 13, wherein for an editing operation of the document, said ID table update means deletes a record of the document from said ID table and said link information table update means updates contents of said link information table in accordance with deletion of the document.

* * * * *

UNITED STATES PATENT AND TRADEMARK OFFICE
CERTIFICATE OF CORRECTION

PATENT NO. : 5,897,643
DATED : April 27, 1999
INVENTOR(S) : Takashi MATSUMOTO

It is certified that error appears in the above-identified patent and that said Letters Patent is hereby corrected as shown below:

Claim 14, Column 12, line 46, "series" should read --server--.

Signed and Sealed this

Eighteenth Day of April, 2000

Q. TODD DICKINSON

*Attest:*

*Attesting Officer*  *Director of Patents and Trademarks*